United States Patent [19]

Percevaut et al.

[11] 4,096,214

[45] Jun. 20, 1978

[54] MULTICELLULAR REACTOR WITH LIQUID/GAS PHASE CONTACTS

[76] Inventors: Emile Henri Gabriel Percevaut, rue de Longjumeau, Chilly Mazarin (Essonne); Christian Belin, 15 Chemin des Aulnaies Residence les Aulnaies, Saint Arnoult en Yvelines (Yvelines), both of France

[21] Appl. No.: 773,412

[22] Filed: Mar. 1, 1977

Related U.S. Application Data

[63] Continuation-in-part of Ser. No. 590,304, Jun. 25, 1975, abandoned.

[30] Foreign Application Priority Data

Jun. 25, 1974 France .................................. 74 22117

[51] Int. Cl.² ............................................. B05B 17/00
[52] U.S. Cl. .................................... 261/79 A; 261/112
[58] Field of Search ............................. 261/108–112, 261/153, 155, 79 A; 23/283

[56] References Cited

U.S. PATENT DOCUMENTS

| | | | |
|---|---|---|---|
| 1,847,845 | 3/1932 | Mullen | 261/153 X |
| 3,285,587 | 11/1966 | Huber | 261/109 X |
| 3,316,064 | 4/1967 | Kuzuoka et al. | 261/153 X |
| 3,395,515 | 8/1968 | Murray | 261/108 X |
| 3,466,019 | 9/1969 | Priestley | 261/112 |

FOREIGN PATENT DOCUMENTS

1,073,449  9/1954  France .................................. 261/153

*Primary Examiner*—William A. Cuchlinski, Jr.
*Attorney, Agent, or Firm*—Mason, Fenwick & Lawrence

[57] ABSTRACT

A reactor apparatus for contacting a gas with a liquid including geometrically patterned cells connected in series to generate narrow and large areas with connecting neck portions wherein the flow of gas is reversed to create turbulent gas flow which produces suspension of liquid droplets and liquid/gas emulsions and which creates internal recycling of the liquid as the liquid flows through the cells.

17 Claims, 17 Drawing Figures

Fig_1

Fig_2

Fig_2a

Fig_3

MULTICELLULAR REACTOR WITH LIQUID/GAS PHASE CONTACTS

This application is a continuation-in-part of application Ser. No. 590,304 filed June 25, 1975 now abandoned.

The present invention relates to a gas/liquid phase contactor which utilizes the following three aerodynamic and hydraulic phenomena hereafter referred to as Effects 1, 2 and 3:

1. Pelling off the boundary layers of gas and of liquid.
2. Reversal in the direction of flow of the jets of gas with creation of gas/liquid droplets and emulsions.
3. Suspension of droplets and emulsions in the jets of gas with recycling thereof in a given geometrical volume.

The present invention is not an improvement over known gas/liquid transfer systems but a new assembly which meets the requirements of gas/liquid contacting by controlling aerodynamic and hydraulic effects on a macroscopic scale.

The known apparatus for achieving gas/liquid contacting are classified in several categories, namely:
(a) Filling-in, filling-up, etc., with flowing of liquid
(b) Tuyeres, venturis, gates and plates, etc.
(c) Pulverization chambers.

These apparatus function according to different principles including the following:
(a) Generation of a maximum turbulence of gas on a large support surface on which the liquids are flowed but without removing the layer of liquid from the support surface.
(b) Dispersion of the gas in the liquid through the dynamic energy of the gaseous currents.
(c) Dispersion of the liquid under pressure in the gas.

Previously known devices have not provided control of all of the following parameters:
gas liquid interface area
liquid flow/gas flow
pressure energy in gases or loss of charge
pressure energy in the liquids
rate of liquid recycling
flow control of jets of gas or uniform distribution of the gas flow
uniform distribution of the liquids
capacity for processing
polyvalency of function when facing various problems such as cleaning, gas washing, adsorption or absorption, liquid enrichment, heat transfer, etc.
clogging and easy, complete disassembly
initial cost
ability to economically obtain ratios of gas/liquid transfer in the vicinity of 1.

The present invention provides a device permitting simultaneous or independent control of the above-mentioned parameters.

The present invention permits control of the Effects 1, 2 and 3 which include pelling off, reversal and suspension, as discussed above, to control the liquid recycling, without dripping effect but with controlled flowing back.

Therefore the object of the present invention is to provide a novel reactor.

Another object of the present invention is to generate geometrically patterned cells of specific type, shape and size to accomplish the desired liquid/gas contacting.

An additional object of the present invention is to generate an assembly of specific arrangements of geometrically patterned cells which utilize pelling off, reversal and suspension effects to process desired volumes of gas and liquid.

A further object of the present invention is to generate an assembly of cells of specific arrangements to provide repeated gas/liquid transfers.

These and other objects of the present invention will become apparent from the following detailed description, taken in conjunction with the accompanying drawings.

According to the present invention, the gases to be treated, with or without any enrichment of the washing-liquid, pass through the channels which are preferably vertical and include panels arranged opposite each other. The panels are systematically counter-folded according to preferential angles described hereafter to provide passages which are horizontal, rectilinear and perpendicular to the direction of flow of the gases. The object of such an arrangement being to generate, between the gases and the liquid, aerodynamic whirling effects with internal recycling of the liquid in each cell. A certain adjustable proportion of the liquid which is recycled in flowing back in each cell is adjustable and depending on the ratio of gas flow to liquid flow and on the volume between each panel at the neck of the patterns.

Figure 3:
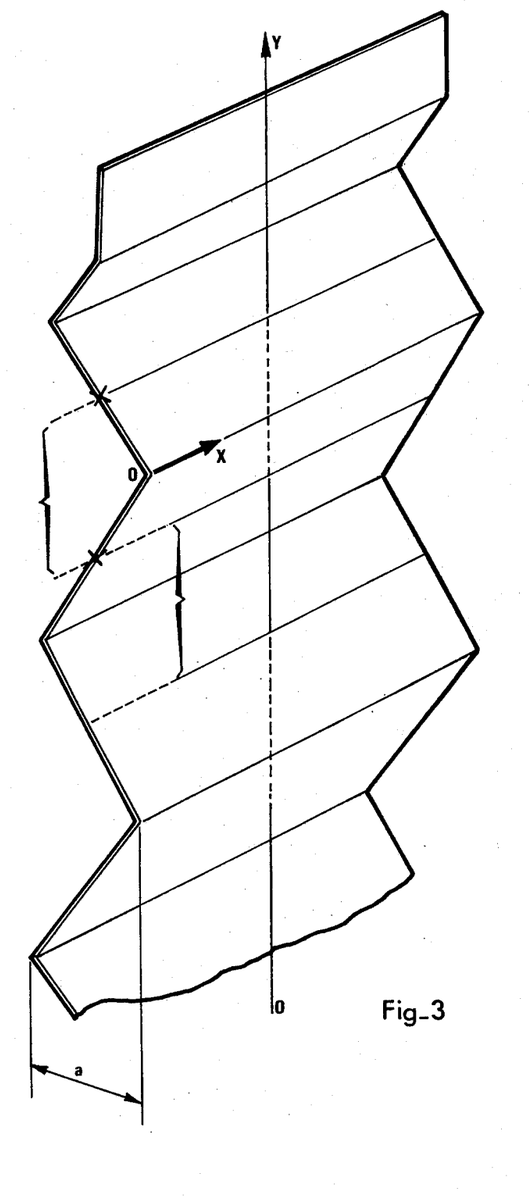
FIG. 3 is a perspective view of one of the panels constituting the reactor.
Figure 4A:
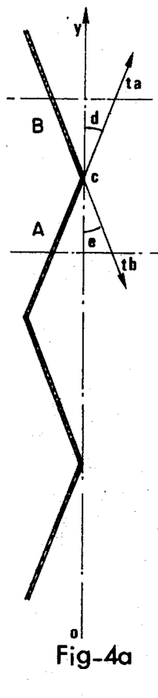
FIGS. 4a to 4d show various embodiments of the panels.
Figure 4B:
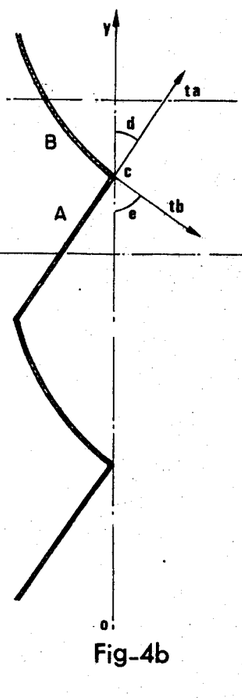
Figures 4C, 4D:
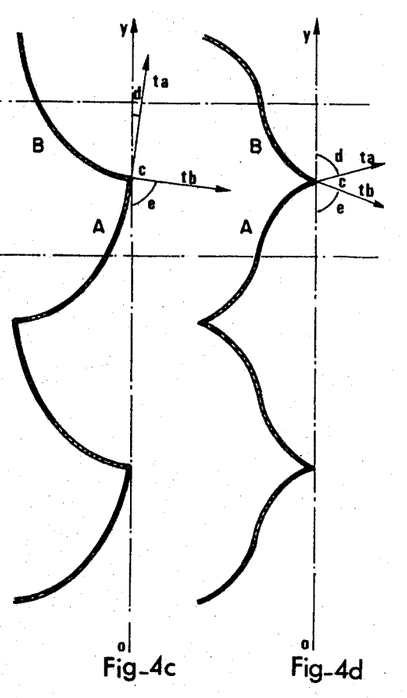
Figure 6:
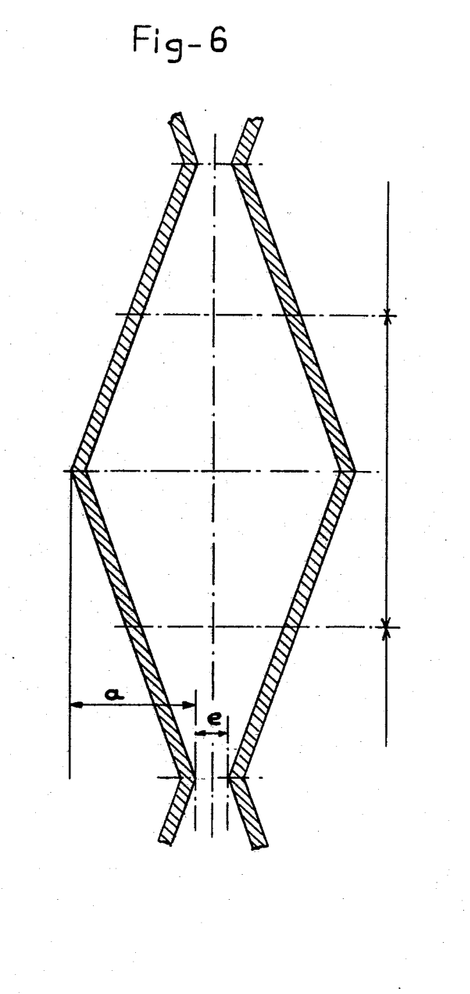
FIGS. 6, 7 and 8 illustrate characteristics of the present invention.
Figure 7:
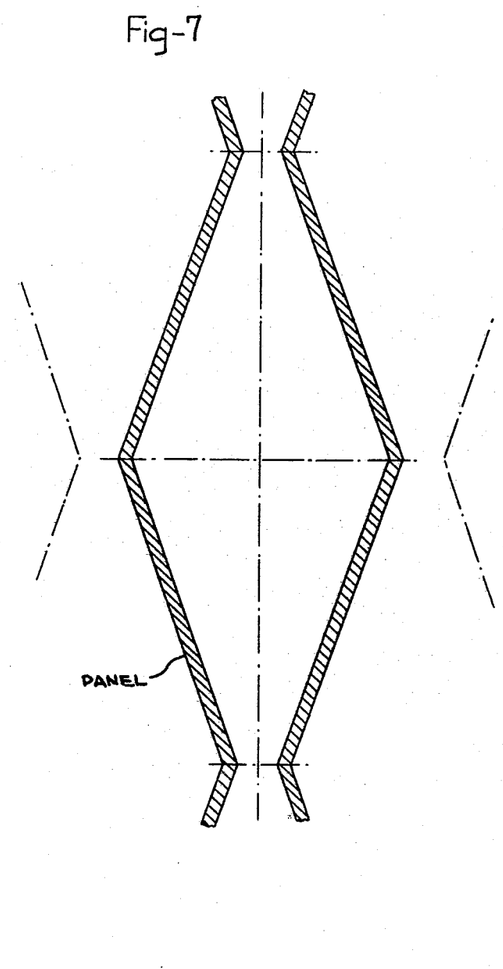
Figure 8:
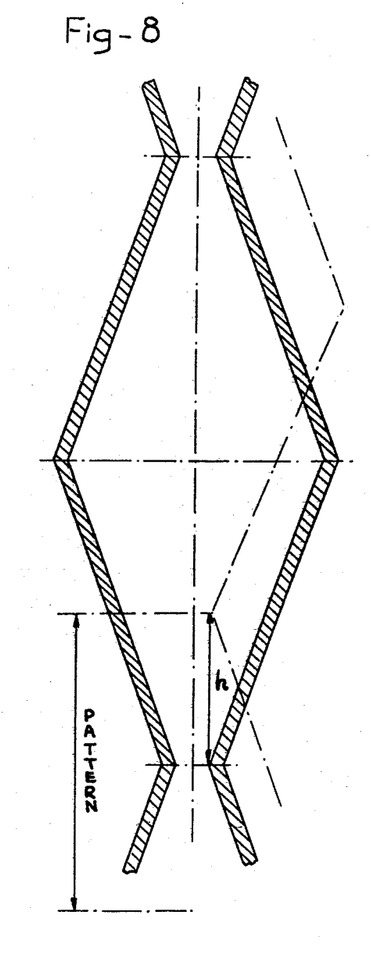

According to the present invention the patterns on the walls of the cells are used in opposed or symmetrical pairs as shown in FIG. 6 with two panels at a distance "e" with $0 < e < 5a$ where "a" is the thickness of the patterns as shown in FIG. 6. The patterns are joined together in panels comprising at least two complementary patterns as suggested in FIG. 7. The patterns are offset in relation to each other with $0 \leq h <$ length of a pattern as shown in FIG. 3.

The panel disposition according to the present invention are also characterized in that the volume of gas V which must be completly treated is divided into "n" identical volumes by $n + 1$ panels which create similar pressure and flow characteristics. Each volume $V/n$ of gas must not communicated with contigeous chanel for panels comprising at least two patterns.

These patterns are characterized by convergent and divergent portions separated by a neck portion, such as shown in FIGS. 5a through 5e and described hereafter. A cell is definited by area comprising between two necks in a vertical direction and the two patterns of concomittent panel in the other direction. The liquids flow in the cells from the top and downwardly due to gravity thereby providing contact with the gases in the cells as indicated in FIG. 9.

Figure 9:
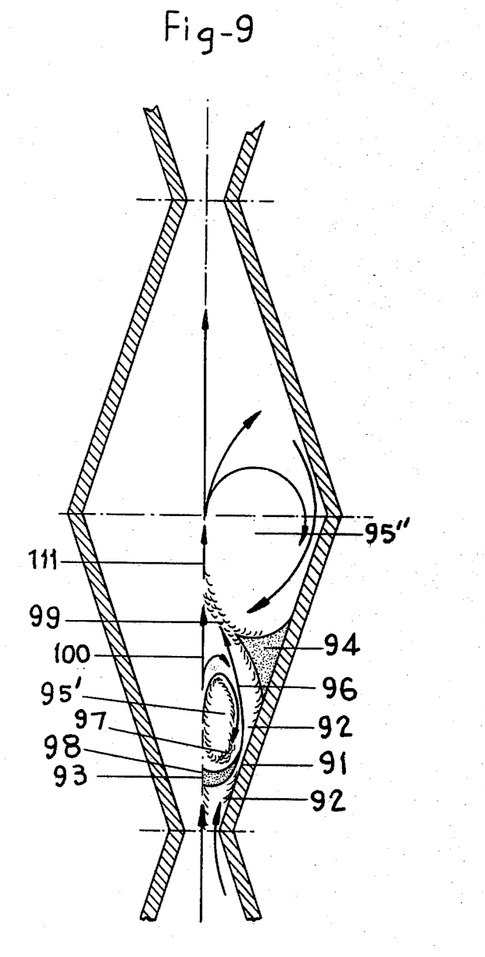
FIG. 9 illustrates the phenomena of the present invention.

A reactor according to the present invention produces the following phenomena, as indicated in FIG. 9, within each cell:

91. Pelling off effect of the layer of the liquid film at the neck or narrowing (initiation of Effect 1 cited above), 92. Generation of a separating jet of gas, 93. Generation of a liquid pool which permits a jet of air 92 to penetrate beneath it and yet remain stable (the end of Effect 1 cited at the beginning of the text), 94. Creation of a second surge of liquid through the jet of gas 92, 95. Generation of two recycling areas 95' and 95" with two jets of turbulent gas behind liquid pools 93 and 94, 96. Recycling of the jet of turbulent gas 95' in opposition to the jet of gas 92 (beginning of Effect 2 cited at the beginning of the text), 97. Generation in the turbulency described in 96 of a liquid/gas emulsion recycled at 98, 98. Vanishing area of the emulsion 97 (the end of Effect 2), 99. The same as at 8, 100. Suspending the droplets and emulsions in the main jet, (Effect III cited at the beginning of the text). These phenomena in 100 are linked together during pulsatory or stabilized regimes depending on the configuration of the apparatus.

Thus, the invention produces the generation of these effects within the channels formed by two panels facing each other on a level with geometrical patterns forming narrowed areas or necks between widened areas called cells.

The dynamic damping reactions of the present invention are similar to those generated in the neck of a standard cylindrical Venturi with effects of differential pressure keeping the liquids in suspension in the gases. The reactions generated during mixing are provided by the phenomena of turbulence of the "trail" type on or behind the wing of an aircraft.

The present device provides continuous repeating patterns generating these "Venturi" and "trail" effects which can be repeated as many times as necessary to achieve optimal output in gas purifying or in liquid enrichment. Since the repeating patterns are continuous, clogging due to deposits, sedimentation or trapping are practically eliminated.

Several panels of these patterns can be arranged in one and the same supporting enclosure to achieve separate and different purifying or enrichment reactions.

Figure 1:
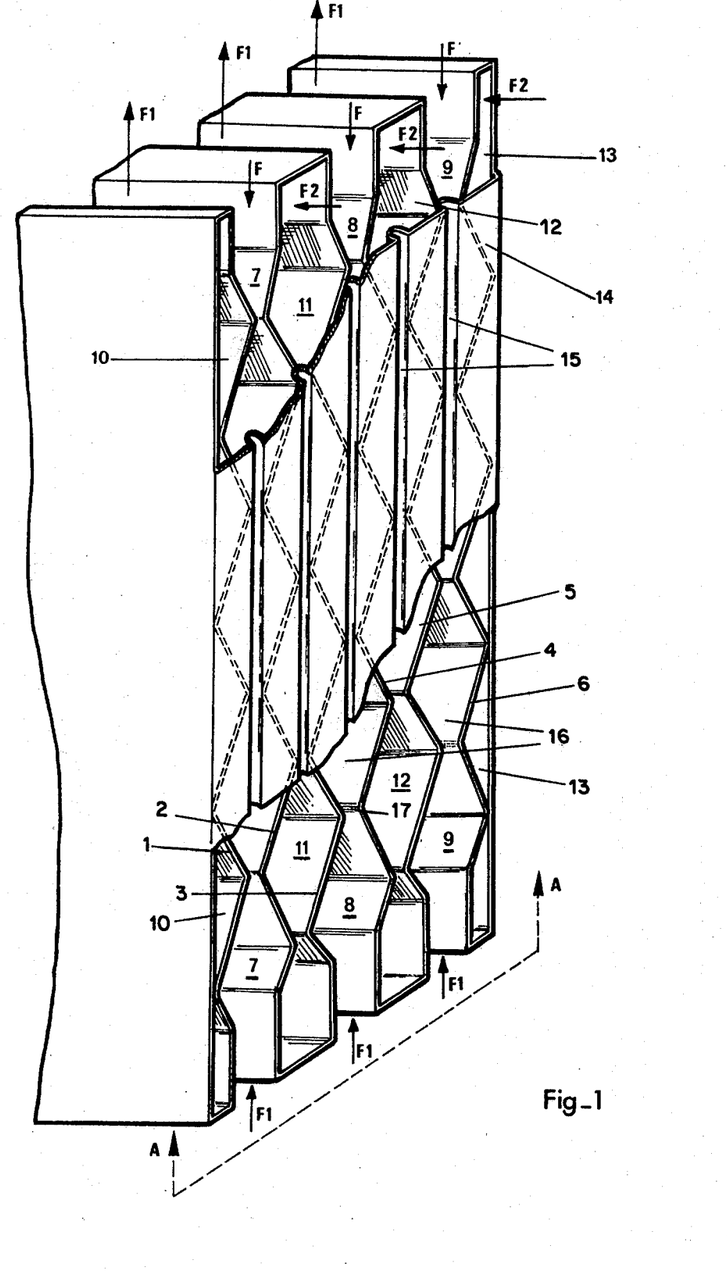
FIG. 1 is a fragmentary perspective view of a reactor according to the present invention.

The supporting enclosure 14 includes an external envelope to contain the panels. Two opposite lateral surfaces of the supporting enclosure, which are perpendicular to the panels, have ridges 15 to position the panels 1 through 7 without necessitating any welding or fasteners thereby providing a constant spacing of the neck portions and cells. This arrangement permits simple replacement of a single panel when necessary.

As shown in FIG. 1, the device consists of six counter-folded vertical panels 1 through 6, which provide three median channels of gas/liquid 7, 8 and 9, wherein the liquid flows downwards in the direction of arrows F while the gas flows in the direction of the arrows F1. The channels 7, 8 and 9 are separated, for example, at each side, from each other by heat exchanger channels 10, 11, 12, 13 through which air or a heated liquid flow in the direction of arrows F2.

The external envelope made of metal or any other material is shown at 14, said envelope carrying longitudinal box-pleats 15 designed to embed the counter-folded panels 1, 2, 3 etc. and delimit and keep constant the spaces between the patterns of the parallel panels.

A reactor according to the present invention includes an assembly of vertical parallel panels 1 to 6 with each panel folded, shaped or molded according to shapes which repeat along the axis O-Y of each panel as shown in FIG. 3. Each shape is repeated along the length of a panel with each shape forming a pattern by the translation of the shape along an axis O-X, as shown in FIG. 3, perpendicular to the axis of the panel.

Each pattern has a depth "a" called the thickness of the panel as shown in FIG. 3 and described in more detail hereafter.

The number of times the pattern is repeated determines the number of the cells 16 and necks 17 which in turn establishes the internal primary recycling of the washing or enrichment liquids, as well as the total output gas/liquid contact to be obtained.

Figures 2, 2A:
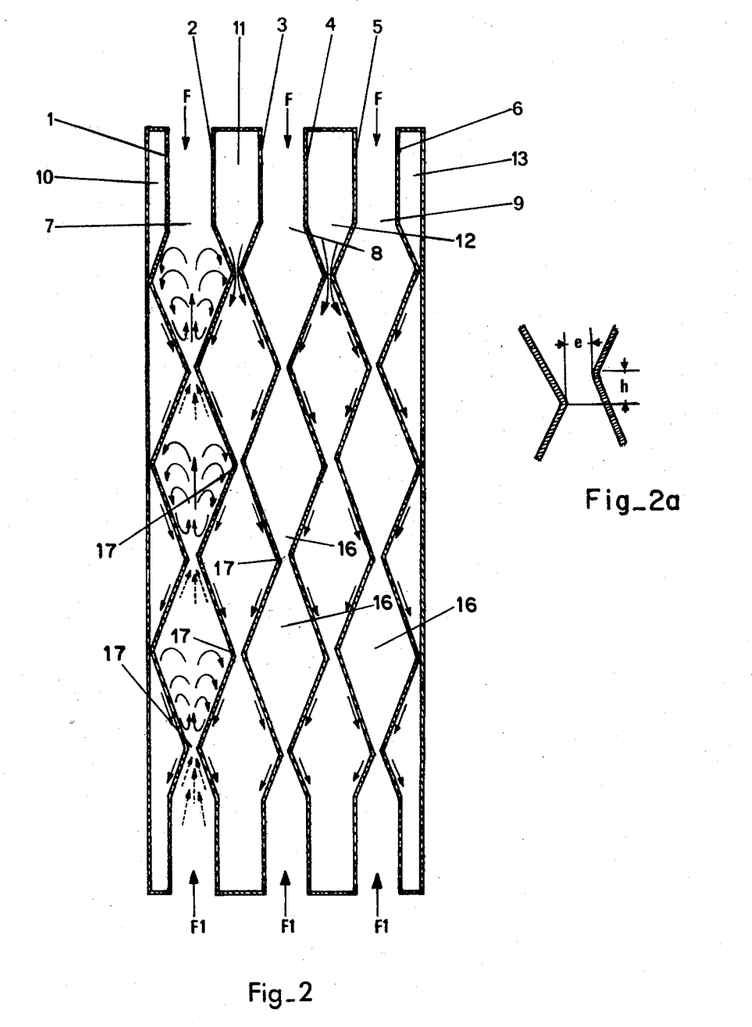
FIG. 2 is a section view taken along lines A—A of FIG. 1.

The patterns of each panel correspond to the adjacent panel with the patterns being vertically offset by a distance "h", as shown in FIG. 2.

The distance "e" between adjacent panels, as shown in FIG. 2, depends on the shape of the pattern and the type of liquid to be introduced into the gases such as single liquids, fluidized beds, charge liquid, etc. and is selected to optimize the aerodynamic effects of the adjacent patterns of the various panels. The distance "e" is such that $0 < "e" < 5 \, a$, where "a" is the thickness of the panels and "e" is normally less than 20 mm.

The offset "h" as shown in FIG. 2 between adjacent panels depends on the type of damping, recycling, liquid and the ratio of the flow of the liquids from one pattern to another. The offset "h" is selected so that the aerodynamic effects add to each other in order to provide maximum damping. The length "h" of the offset ranges between zero and the length of a pattern; however, it will normally be less than 30 mm.

"e" depends also of the proportion sought between the quantity of liquid and the quantity of gas to be processed is function of the rate of the internal recycling of the same liquid within the pattern. Internal recycling depends on the concentration of the gaseous bodies and aerosols to be recovered in the gases. All this in such a manner that the speed "v" of the gases within the necks 17 normally ranges between 0.5 and 100 meters per second.

Referring to FIGS. 4a through 4d, which show various embodiment of the panels, it can be seen that each pattern has three curved elements including a lower curve "A", an upper curve "B" and the equivalence of a point of inflection "c". At the point of inflection, the tangent "ta" of the lower curve forms an angle "d" with axis O-Y of the panel with angle "d" ranging from 0° to 90° and the tangent "tb" of the upper curve forms an angle "e" with the axis O-Y of the panel with angle "e" ranging from +90° to −90°.

The gases and the liquids come into contact at each point of inflection with the aerodynamic effects occurring at these points in the flowing direction of the gases.

The volume between two consecutive points of inflection of a panel and the two consecutive points of inflection of the adjacent panel constitutes the processing cell 16 wherein the liquids are partially or totally recycled.

It should be noted that the curves of each panel, above and beneath each point of inflection, can vary with FIGS. 4a through 4e being representative examples. These curves may be curves of any description including straight lines or portions of circles, cycloids, cardioids, hyperbolas, parabolas, ellipses or the like. Furthermore, the lower curve and the upper curve at the point of inflection may be different or identical.

Figures 5A, 5B:
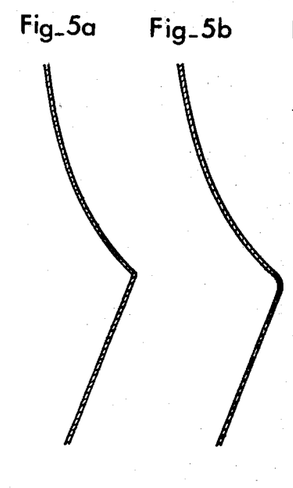
FIGS. 5a to 5e show various embodiments of the points of inflection where the panels are folded.
Figure 5C:
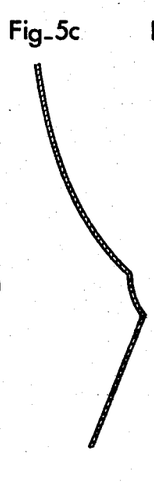
Figures 5D, 5E:
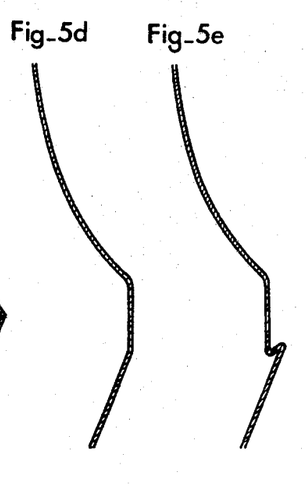

Depending on the nature of the materials to be processed, the result sought and the forms of processing, the shape of the points of inflection may vary. Thus, it can be seen in FIGS. 5a through 5e that the point of inflection of the panels may be sharp (FIG. 5a), round (FIG. 5b), a curved area (FIG. 5c), a plane area (FIG. 5d), or a complex shape (FIG. 5e). Furthermore, it will be noted that, on the panels determining the channels, points of inflection can be removed at equal intervals from the patterns.

The panels constituting the reactor can be inclined until the axis O-Y is horizontal without necessitating an off-setting of the patterns of the panels. The panels such as those described above can be replaced by a succession of portions of panels or of separated patterns positioned along the axis O-Y.

A reactor according to the present invention can function without any heat exchange. The free areas between the channels may then serve for purification of the gases or the enrichment of the liquids, as provided by the invention.

Figure 10:
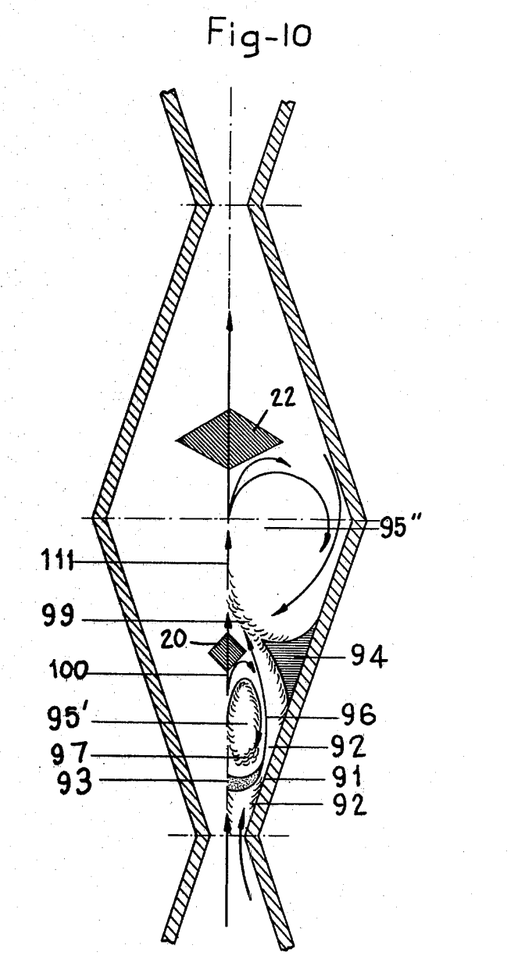
FIG. 10 shows elements to stabilize the phenomena shown in FIG. 9.

Also, according to the present invention, stabilizing elements 20 and 22 for reverting the jets of gas, as shown in FIG. 10, can be provided between the panel and within the cells. The stabilizing elements 20 and 22 may be formed as hollow or solid rods positioned across the flow passageways between the panels as shown in FIG. 10 to stabilize the phenomenon occurring within the cells.

The geometrical patterns defined above and corresponding to FIG. 5 can be fitted together as shown in FIGS. 4, 6, 7 and 8 and rotated about the axis of symmetry OX, of the assembly to produce a circular assembly with circular panels.

The assembly can be made from short assemblies of panels with the length and height of the main assembly being a multiple of the length and height of the short assemblies.

The assembly can be fitted from panels alternately crossed in compact blocks one upon another.

It is to be understood that numerous modifications of the disclosed embodiments of the subject invention will undoubtedly occur to those of skill in the art and the spirit and scope of the invention is limited solely in light of the appended claims.

I claim:

1. A reactor for contacting a liquid with a gas comprising panels forming a flow passageway through which the gas and the liquid may flow in generally opposite directions, said panels forming a plurality of restrictions called a pattern spaced along the passageway to create narrow zones separated by enlarged zones to form reaction cells, aerodynamic means in the passageway for directing a portion of the flow of gas against patterns to pell off the film of liquid from the passageway walls, for reversing the direction of flow of gas in a cell and creating turbulence to product droplets and liquid/gas emulsion, and for creating an aerodynamic swirling between the gas and the liquid to cause internal recycling of a predetermined portion of the liquid in each cell and a pattern stabilizing means for stabilizing the reversing of the direction of flow of gas in a portion of the enlarged zone thereby achieving intimate mixing of the gas and the liquid while permitting the recycling of a predetermined portion of the liquid in each of the cells.

2. The reactor according to claim 1 wherein the passageway is formed between a pair of panels extending between two lateral opposite surfaces with the panels generally symmetrical about the vertical centerline of the passageway and with the panels repeatedly reversely folded to form segments of said panels or patterns along the passageway creating the restrictions and enlarged zones.

3. The reactor according to claim 2 wherein the panels are perpendicular to the two plates.

4. The reactor according to claim 2 wherein the folds in the panels are offset along the passageway with respect to one another.

5. The reactor of claim 4 wherein the offset may vary from zero to the length of a pattern.

6. The reactor of claim 2 wherein the width of the restriction or neck at the inflections points is less than five times the width of one of the two correspondant patterns at the said neck.

7. The reactor according claim 1 wherein the number "n" of the pannels constitued by the symetrical patterns divide in "n-1" equal portions the flow of gas and the flow of liquid.

8. The reactor of claim 1 wherein the restriction or pattern is formed by an upper curved portion, a lower curved portion and an intermediate point of inflection in the panel with the angle of the tangent of the lower curve at the point of inflection being between zero and ninety degrees relative to the centerline of the passageway and the angle of the tangent of the upper curve at the point of inflection being between minus ninety degrees and plus ninety degrees relative to the centerline of the passageway.

9. The reactor of claim 8 wherein the lower and upper curved portions are formed of sections of straight lines, circles, cycloids, cardioids, hyperbolas, parabolas and ellipses and derivated mathematical functions.

10. The reactor of claim 1 wherein the stabilizing means includes a member having a parallelpiped shaped cross-section extending across a portion of the passageway within each cell thereby providing a stabilization of the reversing effect on the flow of gas.

11. The reactor of claim 1 wherein the passageways are oriented in a vertical direction with the liquid entering at the top thereof and the gas entering at the bottom thereof.

12. The reactor of claim 1 wherein the said patterns of the pannels are provided with said inflection points so that the speed of the gases at the neck is greater than 0.5 m/s and lower than 100 m/s so as to prevent streaming of the liquids in the form of a liquid film from occuring and generate a flowing back of those liquids.

13. The reactor of claim 1 wherein the number of the said cells of each passageway range between 1 and 300.

14. The reactor of claim 1 wherein the stabilizing means comprises a plurality of linear sections shaped to correspond to the form of the pattern of the passageway panels.

15. The reactor of claim 14 wherein the linear sections are formed of a portion of a circle, cycloid, cardioid, hyperbola, parabola or ellipse.

16. The reactor of claim 15 wherein the stabilizer means are folded panels inserted in the passageway panels.

17. The reactor of claim 14 wherein the linear sections are horizontally disposed in vertical shifted series between the passageway panels.

* * * * *